April 27, 1965   H. R. WARD   3,181,156
METHOD AND APPARATUS FOR PROCESSING SIGNALS
Filed Oct. 15, 1962
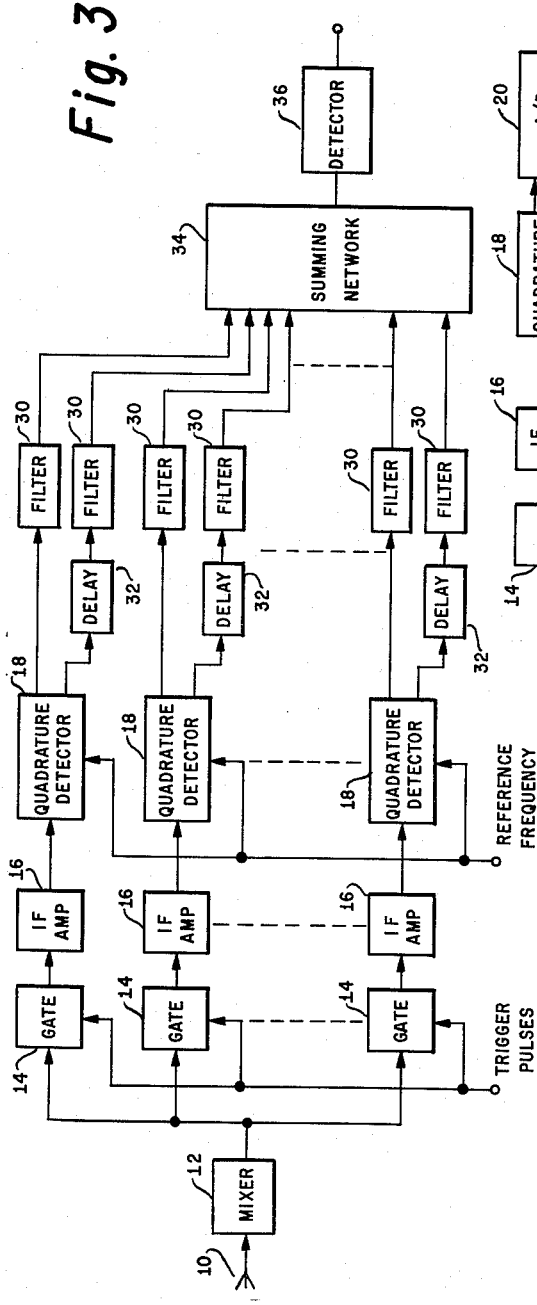
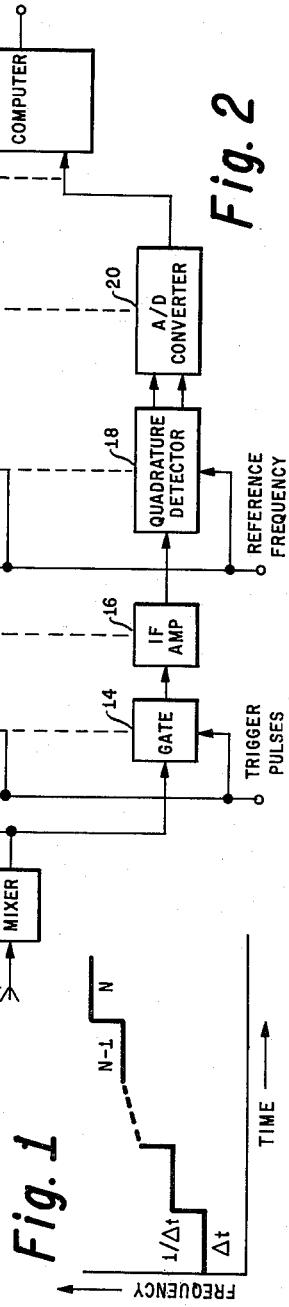
INVENTOR.
HAROLD R. WARD
BY
ATTORNEY

United States Patent Office 3,181,156
Patented Apr. 27, 1965

3,181,156
METHOD AND APPARATUS FOR PROCESSING SIGNALS
Harold R. Ward, Bedford, Mass., assignor to Sylvania Electric Products Inc., a corporation of Delaware
Filed Oct. 15, 1962, Ser. No. 230,553
9 Claims. (Cl. 343—17.5)

The present invention relates generally to radar systems and more particularly to radar receiving systems in which range resolution is not limited by circuit bandwidth.

High range resolution is needed in many radar applications, especially in defense systems in which, for example, individual units of a missile cloud must be recognized. Still higher resolution is required if radar signature information is needed to distinguish a target. Present methods of achieving high range resolution usually involve pulse compression techniques by which a coded pulse is transmitted which, upon reception, is compressed in the receiver to a very short pulse, compressed pulse widths in the order of one tenth of a microsecond being realizable with these techniques. As the range resolution is usually in the order of one pulse width, the range resolution is therefore limited by the pulse width and, consequently, by the bandwidth of the video circuits. Since video bandwidths greater than ten megacycles are very difficult to achieve, present radar is limited in range resolution to about 50 feet.

With an appreciation of the foregoing limitations applicant has as a primary object of the present invention to provide a radar system of increased range resolution.

Another object of the present invention is to provide a high resolution radar without increased bandwidth requirements.

Another object of the invention is to provide a radar system in which the radar returns are processed in non-real time.

Still another object of the invention is to provide a radar system in which the radar returns are time sampled and then reconstructed in non-real time to reproduce the original radar return.

Briefly, the invention resides in the technique of sampling the frequency spectrum of a received signal and then combining the sampled information in non-real time thereby reconstructing the original waveform in an expanded interval of time. The samples, which are spaced in frequency by the reciprocal of the time interval to be examined, represent Fourier components which, when combined according to a Fourier series, produce a signal in which target characteristic information is accurately resolved without dependence upon circuit bandwidth.

The foregoing and other objects, features, and advantages of the invention, together with a better understanding of its operation, will become apparent from the following detailed description taken in conjunction with the accompanying drawings wherein:

FIG. 1 is a plot of a stepped chirp transmitter pulse useful in implementing the present invention;

FIG. 2 is a block diagram of one embodiment of the present invention employing a digital processor; and FIG. 3 is a block diagram of another embodiment of the present invention employing an analog processor.

The limitation upon resolution imposed by the bandwidth of video circuits can be overcome if a received signal is expanded into a Fourier series and the information recombined in non-real time to obtain a replica of the signal expanded in time. The information necessary to describe a signal contained in an interval of time $\Delta t$ can be expressed by the Fourier series $$v(t) = \sum_{N=0}^{\infty} a_n \cos(N\omega t) + b_n \sin(n\omega t) \quad (1)$$

For the present application, only a finite number of terms will be required in the expansion, since the Fourier components represent samples of the transmitted spectrum of a finite bandwith W. By dividing the bandwidth W by the sample spacing $1/\Delta t$, it is evident that $W\Delta t$ sample frequencies are required to represent the original waveform. Since two parameters are necessary to describe a sinusoid of known frequency, either the amplitude and phase of the sample vector or two quadrature components of the sample vector must be measured in order to define the sinusoid represented by the vector. Thus to process a received signal, it is necessary to sample the received spectrum at discrete frequencies, measure the parameters necessary to describe the spectrum at each sample frequency, and reconstruct the waveform by computing the Fourier series. A separate computation must be performed at each sample frequency in order to define the sample vector at that frequency; therefore, the processing of the signal cannot be done in real time but rather must be performed at a slower or non-real rate, since the information usually is arriving at a faster rate than can be handled by presently available processing equipment.

Although the technique of the present invention can be used to process a portion of any band limited waveform, the following embodiments, which are by way of illustration only, utilize a stepped chirp transmitter pulse of the type commonly used in pulse compression systems. This type of transmission lends itself to time sampling and therefore is particularly apt in explaining the invention. As can be seen from FIG. 1, the transmitted signal consists of a coded pulse of N steps each having a duration $\Delta t$ and a frequency separation $1/\Delta t$. Since the total transmitted bandwidth is $N/\Delta t$, the resolution of the system is $\Delta t/N$. Accordingly, the period of time $\Delta t$ can be divided into N resolvable parts thereby increasing resolution by a factor N. Typically, the pulse consists of fifty steps each having a one microsecond duration. The bandwidth of the transmitted pulse is fifty megacycles; accordingly, the resolution is one fiftieth of a microsecond, or 10 feet.

A digital signal processor which can implement the technique of the invention is shown in FIG. 2 and is designed to produce a pair of quadrature components at each sample frequency, convert these to digital form, and then compute the envelope of the received signal by means of Equation 1.

The processor has N signal channels corresponding to the N frequency steps in the transmitted pulse, which in this case is fifty. For simplicity, only three channels are shown in FIG. 2, since all channels are identical except that, of course, the several channels are tuned to their respective frequency. A signal reflected from a target is received by an antenna 10, heterodyned to an intermediate frequency in a mixer 12, then applied through a bank of gates 14 to the IF amplifiers 16. Gates 14 are triggered sequentially by gate pulses, which can be derived by any of several well-known means such as, for example, a tapped delay line which is energized by a pulse from the transmitter. Each succeeding frequency step is channeled by the gates to a corresponding IF amplifier 16 which has a frequency response centered at the frequency of that portion of the stepped pulse associated with it. The outputs of IF amplifiers 16 are applied to the quadrature detectors 18, each of which produce two quadrature signals representing the sine and cosine coefficients of the Fourier series. The quadrature components are digitized by the analog-to-digital converters 20, then fed to a digital computer which combines the information according to the Fourier series to obtain a replica of the received signals. At least N separate values of $v(t)$ must be computed for N different points in time within the interval $\Delta t$; consequently, the envelope must be reconstructed at a slower rate as the computer could not perform the required computation at a real rate. The time interval between transmitted pulses is sufficient, however, for the computer to complete the computation; or stated another way, the time period between successive echo returns from a particular target is adequate to complete the processing.

The invention can also be implemented by analog means as is illustrated in FIG. 3. The apparatus is identical and the signal is processed the same as in the system of FIG. 2 up to the point where quadrature components are produced by quadrature detectors 18. At this point, the pulses at the outputs of the quadrature detectors are applied to the crystal filters 30 which provide sinusoidal output signals corresponding to the Fourier components of the received signal. Filters 30 are arranged in pairs having the same frequency, each pair being associated with one quadrature detector 18. Delay networks 32 are provided in one output of each quadrature detector in order to insure a 90 degree phase difference between filter output signals, thus insuring that each filter rings with the proper amplitude and phase. This delay is equal to one quarter cycle of the filter frequency. The output sinusoids from filters 30 are combined in summing network 34, and then detected by a detector 36, whose output provides a time expanded reproduction of the original signal envelope. Since the filters 30 ring for a period of time considerably longer than the duration of a received pulse, the return signal can be reproduced at a slower rate, thereby eliminating the dependence of system range resolution upon the bandwidth of the video circuits.

While there has been described what are now thought to be preferred embodiments of the present invention, many modifications and alternative implementations will occur to those skilled in the art without departing from the true spirit and scope of the invention. Also, it will be appreciated by those skilled in the art that the invention can be practiced not only in radar systems, but in any signal processing system in which information from a signal of short duration must be resolved. Accordingly, it is not intended to limit the scope of the invention by what has been particularly described, except as indicated in the appended claims.

What is claimed is:

1. A method of processing signals comprising the steps of sampling a received signal to produce a plurality of sampled signals, quadrature detecting said sampled signals, and combining said detected signals to produce a time expanded replica of said received signal.

2. A method of processing signals comprising the steps of sampling a received signal at a rate equal to the reciprocal of the time interval being examined to produce a plurality of sampled signals, quadrature detecting said sampled signals, and combining said detected signals to produce a time expanded replica of said received signal.

3. In a radar receiver, a method of improving resolution comprising the steps of sampling a received band limited signal at a rate equal to the reciprocal of the sampling interval to produce a plurality of sampled signals, quadrature detecting said sampled signals, and combining said detected signals to produce a time expanded reproduction of said received signal.

4. In a radar receiver, a method of improving resolution comprising the steps of sampling a received band limited signal at a rate equal to the reciprocal of the time interval being examined to produce a plurality of sampled signals, deriving signals from said sampled signals which are representative of the coefficients of a Fourier series, and combining said derived signals to produce a time expanded reproduction of said received signal.

5. In a radar receiver including a plurality of gates for providing signals in timed relation to each other and a plurality of quadrature detectors for providing quadrature signals in response to said gated signals; a method of processing a received band limited signal comprising the steps of, sampling a signal received by said receiver to produce a plurality of sample signals spaced in frequency by the reciprocal of the time interval being sampled, quadrature detecting said sampled signals, converting said detected signals to digital form, and applying said digital signals to a computer which implements a Fourier series whereby a time expanded reproduction of said received signal is generated.

6. Signal processing apparatus which includes means for sampling a received signal at a rate equal to the reciprocal of the sampling interval, means responsive to signals produced by said sampling means for producing signals which are representative of the coefficients of a Fourier series, and means for combining said last-mentioned signals according to the Fourier series.

7. In a radar receiver, signal processing means which include means for sampling a received band limited signal, quadrature detectors responsive to signals produced by said sampling means for producing signals which are representative of the coefficients of a Fourier series, and computing means for combining said last-mentioned signals according to the Fourier series.

8. In a radar receiver, signal processing means which include means for time sampling a received band limited signal, means responsive to signals produced by said sampling means for producing signals which are representative of the coefficients of a Fourier series, means for producing sinusoidal signals in response to said representative signals, and means for summing said sinusoidal signals thereby producing an output signal which is a time expanded version of said received signal.

9. In a radar receiver including a plurality of gates for providing signals in timed relation to each other and a plurality of quadrature detectors for providing quadrature signals in response to said gated signals, a method of processing a received band limited signal comprising the steps of, sampling a band limited signal received by said receiver at a rate equal to the reciprocal of the sampling interval to produce a plurality of sample signals spaced in frequency by the reciprocal of the time interval being sampled, quadrature detecting said sampled signals to produce quadrature signal pairs which are representative of the coefficients of a Fourier series, delaying one of the signals in each quadrature signal pair, producing sinusoidal signals from said detected signals, and combining said siusoidal signals according to the Fourier series.

References Cited by the Examiner

"Pulse Compression, Key to More Efficient Radar Transmission" by Charles E. Cook, Proceedings of the IRE, March, 1960, pages 310–316 relied upon.

"Getting High Range Resolution With Pulse Compression Radar" by Gunnar P. Ohman, Electronics, October 7, 1960, pages 53–57 relied upon.

CHESTER L. JUSTUS, *Primary Examiner*.